United States Patent
Ameis et al.

(10) Patent No.: US 9,151,360 B2
(45) Date of Patent: Oct. 6, 2015

(54) METAL CONNECTION PLATE OF A CHAIN LINK OF AN ENERGY CHAIN

(71) Applicant: Tsubaki Kabelschlepp GmbH, Wenden-Gerlingen (DE)

(72) Inventors: Thomas Ameis, Siegen (DE); Stefan Engel, Netphen (DE); Mark Daub, Reichshof (DE); Sven Kratzke, Lindlar (DE); Ulrich Wagener, Siegen (DE)

(73) Assignee: Tsubaki Kabelschlepp GmbH, Wenden-Gerlingen (DE)

( * ) Notice: Subject to any disclaimer, the term of this patent is extended or adjusted under 35 U.S.C. 154(b) by 0 days.

(21) Appl. No.: 14/387,781

(22) PCT Filed: Mar. 25, 2013

(86) PCT No.: PCT/EP2013/056180
§ 371 (c)(1),
(2) Date: Sep. 24, 2014

(87) PCT Pub. No.: WO2013/144045
PCT Pub. Date: Oct. 3, 2013

(65) Prior Publication Data
US 2015/0059311 A1 Mar. 5, 2015

(30) Foreign Application Priority Data
Mar. 30, 2012 (DE) .................. 10 2012 006 446

(51) Int. Cl.
*F16G 13/16* (2006.01)
*H02G 11/00* (2006.01)
*F16G 15/14* (2006.01)

(52) U.S. Cl.
CPC ............. *F16G 13/16* (2013.01); *F16G 15/14* (2013.01); *H02G 11/006* (2013.01)

(58) Field of Classification Search
CPC ....................................................... F16G 13/16
See application file for complete search history.

(56) References Cited

U.S. PATENT DOCUMENTS

| | | | | |
|---|---|---|---|---|
| 3,921,388 A * | 11/1975 | Loos et al. | ...................... | 59/78.1 |
| 4,499,720 A * | 2/1985 | Klein | .............................. | 59/78.1 |
| 4,625,507 A * | 12/1986 | Moritz et al. | .................. | 59/78.1 |
| 6,161,372 A * | 12/2000 | Wehler | ............................ | 59/78.1 |
| 6,349,534 B1 * | 2/2002 | Zanolla et al. | ................. | 59/78.1 |
| 7,877,978 B2 * | 2/2011 | Heppner et al. | ............... | 59/78.1 |

FOREIGN PATENT DOCUMENTS

| | | |
|---|---|---|
| CN | 101421537 A | 3/2007 |
| DE | 19525478 A1 | 1/1997 |
| DE | 19707966 A1 | 9/1998 |
| DE | 102006017316 A1 | 11/2007 |

* cited by examiner

Primary Examiner — David B. Jones
(74) Attorney, Agent, or Firm — BainwoodHuang

(57) ABSTRACT

A metal connection plate of a chain link of an energy chain, which metal connecting plate has two ends, wherein one end has first elements and the other end has second elements, wherein the first elements can be inserted into the second elements of a further connecting plate in such a way that the connecting plates are rotatably connected to each other. The first and second elements are each formed by a hole having a border. The borders form stop surfaces corresponding to each other, which stop surfaces protrude substantially perpendicularly to an extent to the connecting plate.

16 Claims, 2 Drawing Sheets

Figure 1:
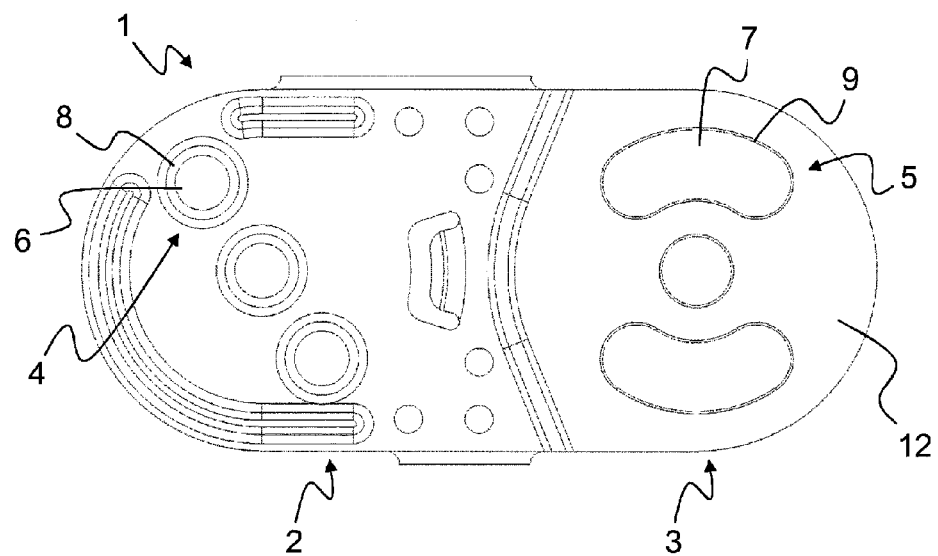

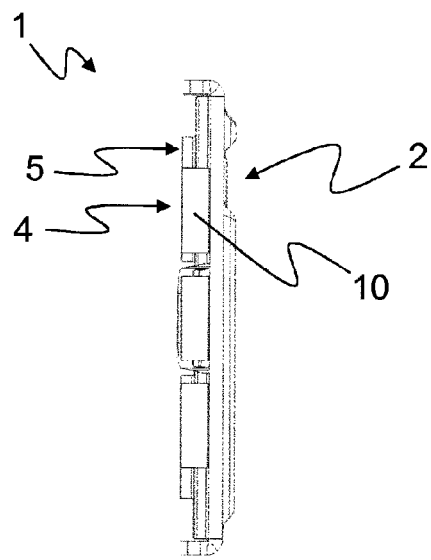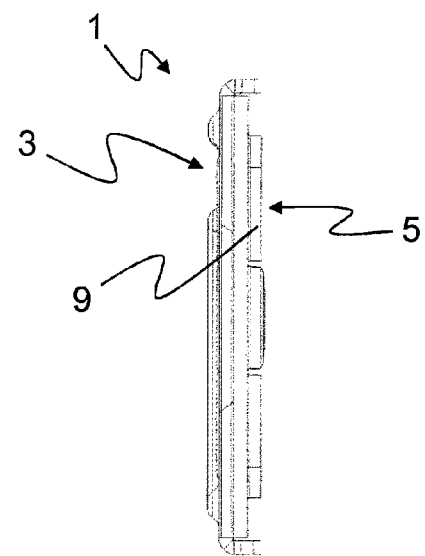
FIG. 3  FIG. 4
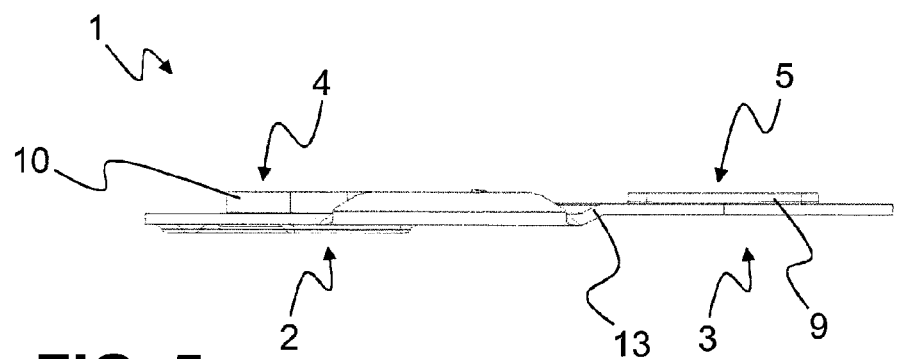
FIG. 5

METAL CONNECTION PLATE OF A CHAIN LINK OF AN ENERGY CHAIN

The subject of the invention relates to a metal connecting plate of a chain link of an energy chain, to a chain link of an energy chain, and also to an energy chain.

For the running of lines, hoses, tubes or the like between a fixed connection point and a movable connection point, so-called energy chains are used. With the lines, energy, consumables or the like are led or fed to the point of consumption. A movable consuming unit can be constituted, for instance, by a slide of a machine tool.

It is known that energy chains can be made from plastic. Such plastics energy chains are restricted in terms of field of application. This restriction can be given by the weight and/or flexibility of the lines, hoses or the like which are to be guided. In particular applications, the weight of the line is so high that it exceeds the bearing capacity of a plastics energy chain. In addition, the use of plastics energy chains can be limited by the environmental impacts.

Energy chains of metal are also known. The energy chains consist of chain links articulately connected to one another. The chain links are formed by two mutually spaced connecting plates, which are connected to one another by at least one transverse web. In DD 129 823, a metal energy chain, for instance, is described. These connecting plates have at one end region arc-shaped apertures, as well as an aperture for receiving a joint bolt. The other end region has bores, through which appropriate bolts can be guided. The bolts are secured by means of appropriate locking means. The manufacturing cost of such an energy chain is not inconsiderable, since a large number of components have to be fitted together.

In DE 31 21 912 A1 is described an energy chain which has pivotable, mutually connected chain links. The chain links comprise connecting plates, in which are provided, coaxially to the joint axes, peripheral, circular-arc-shaped apertures, through which reach elements which, by means of stops at the ends of the apertures, limit the pivot movement of the connecting plates relative to one another. These elements are fixedly connected to an outer limit disk by spot welding. After having been placed through the apertures of the connecting plate, the elements are connected to another outer limit disk.

Based on the above, the object of the present invention is to define a metal connecting plate of a chain link of an energy chain, which connecting plate is easier to make and has increased strength and service life.

This object is achieved according to the invention by a connecting plate having features disclosed herein. Advantageous refinements and embodiments of the connecting plate are disclosed herein as well.

The inventive connecting plate of a chain link of an energy chain has two ends, wherein one end has first elements and the other end has second elements. The first elements can be inserted into the second elements of a further connecting plate in such a way that the connecting plates are rotatably connected to one another. The first and the second elements are respectively formed by a hole having a projecting rim and the projecting rims form mutually corresponding stop faces, which protrude substantially perpendicularly to an extent of the connecting plate.

The metal connecting plates of a chain link of an energy chain are preferably oval or "racetrack-shaped", so that the two ends are arranged, by virtue of the arc-shaped portion, for a bending movement of two chain links of an energy chain. These two ends having the rounded corners are connected to one another by an elongate straight piece, wherein the ends can preferably each occupy an area extending respectively over one-half of the metal connecting plate. Preferably, the two areas of the ends are, at least roughly, equal in size. On a respective end, elements which enable a connection of two structurally identical metal connecting plates are formed. For instance, the second elements are kidney-shaped recesses and the first elements are pin-shaped, so that these can be received in the second elements and enable a limited rotation of two mutually connected metal connecting plates.

Advantageously, the first and second elements are respectively formed by a hole which is made in the metal connecting plate, and around this hole a projecting rim is formed. These projecting rims protrude perpendicularly from the area formed by the metal connecting plate and form a stop face which is wider than the depth or thickness of the metal connecting plate. The stop faces are here formed such that the first and second elements correspond to one another. This means that the first and second elements can be guided to fit one inside the other, so that the metal connecting plates can be rotatably connected to one another. The first elements are herein introduced into the second elements, so that the projecting rims adjoin one another with the stop faces.

The here proposed design means that a thin metal connecting plate material can be used, or a thin metal connecting plate can be used, and yet a relatively wide stop face or contact face between two mutually connected metal connecting plates is formed via the projecting rim of the respectively first and second elements. Furthermore, it is herein advantageous that the metal connecting plate, after the connecting plate material has been cut to size, can be made by a single forming work step, for example deep-drawing, by means of a single tool. This is examined in greater detail in the description of the method for making the metal connecting plate.

In a further advantageous embodiment of the metal connecting plate, the stop faces are shaped such that they fully overlap.

This means, in particular, that the respective stop faces of the first elements in the assembly of two connecting plates extend at least so far into the stop faces of the second elements that they reach in the assembly at least up to the extent of the stop face of the second elements, or even extend beyond this same. It is hereby ensured that a largest possible contact face is obtained. For many applications, it is necessary that the chain links of an energy chain are likewise bendable about an axis perpendicular to the first and second elements. To this end, it is advantageous if the first elements are realized somewhat longer than the second elements, so that the stop faces fully overlap one another even in the bent state. In a further aspect, a joint can be formed simply via a first element disposed in the center of rotation and a corresponding second element, without the need for further implements, such as, for example, a bolt.

In a further advantageous embodiment of the metal connecting plate, the first elements, at least in part, are arranged to receive a rivet.

Through the formation of a rimmed hole, a tailor-made receptacle for the rivet can already be formed, so that no further holes and/or guides have to be formed in the connecting plate. In particular, the heads of the rivet can here produce a lateral stop for the securement of the mutually connected elements, in that the head projects beyond the projecting rim of the outer element.

In a further advantageous embodiment of the metal connecting plate, the connecting plate is produced from a steel alloy, in particular a special steel alloy, or an aluminum alloy. Particularly advantageous is the formation of a connecting plate from an aluminum alloy having a tensile strength $R_m$ from 190 to 540 N/mm² and a yield point $R_{p0,2}$ from 280 to 470 N/mm². The formation of the connecting plate from a steel alloy having a tensile force $R_m$ from 250 to 1200 N/mm² and a yield point $R_{p0,2}$ from 150 to 1000 N/mm², in particular a steel alloy having a tensile force $R_m$ from 250 to 800 N/mm² and a yield point $R_{p0,2}$ from 150 to 300 N/mm², is preferred.

As a result of the above-described design of the metal connecting plate, it is possible to make the metal connecting plate very thin and to use very solid materials which, due to the geometry of the metal connecting plate, generate no excessive weight and, at the same time, have good flexibility. Previously, significantly more ductile materials had to be used to preclude failure of the connecting plates. Moreover, materials of a lower density had to be used, because the metal connecting plates of the prior art had to be made thicker in order to avoid excessive surface pressure in the connection of the elements.

In a further advantageous embodiment of the metal connecting plates, the connecting plate has increased strength values as a result of surface treatment.

Through surface treatment, the strength values of the connecting plates can be attained, while simultaneously maintaining good ductility of the material used or good flexibility of the metal connecting plate. In particular, it is advantageous simply to harden the surface of the stop faces, so that these are designed to withstand high surface loads and, moreover, the metal connecting plate has good flexibility.

In a further advantageous embodiment of the metal connecting plate, the connecting plate has two first and two second elements.

In the prior art, three or even more elements were frequently used in order to spread the load in the energy chain across this over a larger area in total. With the inventive metal connecting plate, it is now possible to use only two respective elements, so that the possible turning radius between two connected chain links can be significantly enlarged.

In a further advantageous embodiment of the metal connecting plate, the connecting plate is shaped from a metal sheet and the first and second elements are formed by deep-drawing.

The manufacture of the metal connecting plate from a metal sheet can be produced in a particularly simple and cost-effective manner and can be cost-effectively realized both in small batches and in large batches. It was previously disadvantageous that the connecting plates had to be made with thicker metal sheets or specifically by means of other manufacturing technologies, such as, for example, primary forming or machining, in order that a sufficient area could hereby be provided to reduce the surface pressure to a level so that an adequate service life of the metal connecting plate could be attained. As a result of the here proposed metal connecting plate and a corresponding production process, a metal connecting plate can now be cost-effectively shaped from a, in particular thin, metal sheet, wherein the stop faces between two connected connecting plates are formed by deep-drawing. A significant enlargement of the stop faces in relation to the metal connecting plate can hence be achieved. In addition, production with thin metal sheets in relation to previously necessary thicker metal sheets is simpler, because the forming resistance is less.

In a further advantageous embodiment of the metal connecting plate, the first and second elements extend from the connecting plate in the same direction.

In such a production of the metal connecting plate, a one-sided tool, in particular, can be used, that is to say that the metal sheet has to be deep-drawn only from an immersion side. On the other side, a rubber mat, for example, can be used to press the blank against the one-sided tool. Such a method is advantageous, in particular, for small batches or in a production having a large component variance. In this manufacturing process, the use of an expensive second corresponding tool part is spared. Furthermore, it is advantageous that, as a result of such a production, the first elements and the second elements do not butt one against the other with the open side, but with the rounding in the transition from the sheet metal material to the projecting rim.

In a further advantageous embodiment of the metal connecting plate, the first and second elements of two connecting plates can be connected to one another by non-positive and/or positive locking.

The projecting rims create additional areas, into which constrictions and widenings of the rimmed hole can be introduced. The adjacent connecting plates can hence be connected to one another in the manner of a snap fastener. For instance, the projecting rims of two connecting plates of a chain link can be directed respectively inward (or alternatively respectively outward), so that the chain links, due to the flexibility of the relatively thin connecting plates, can be slid one over another and engage with one another in the holes of the first and second elements. In such an embodiment, additional elements, such as, for example, a rivet or a bolt, can advantageously be dispensed with.

Additionally included in the invention is a chain link of an energy chain, which comprises at least two mutually connected connecting plates configured according to the preceding description. In particular, the connecting plates are formed alternatively or additionally, by the method which is described below.

Such a chain link has the advantage, in particular, that it can be made from a small number of parts. Furthermore, the chain link can be assembled without further implements and has a high service life. In addition, the chain link is very light in relation to metal chain links of the prior art and the few individual parts are easy to make and easy to assemble.

The invention further embraces an energy chain for the guided movable reception of energy lines, which energy chain comprises at least two chain links according to the above description. Such an energy chain has a low weight, combined with simultaneously high stability. In addition, the production costs and the material costs in relation to known energy chains are very low, because the elements of the individual chain links can be made with simple production processes which are capable of large batch runs, and high strength can be achieved with low material usage.

Additionally included in the invention is a method for producing a metal connecting plate of a chain link of an energy chain, which method has at least the following work steps:

a) providing a sheet metal material;
b) cutting to size the sheet metal material to form a blank, wherein cutouts are provided in the blank;
c) shaping first elements and second elements by respectively forming a projecting rim around one cutout per element by deep-drawing, so that corresponding stops are formed.
d) forming the blank so that a step is formed and two connecting plates connected to one another via the first elements and the second elements can be aligned parallel to one another in a line.

The method is suitable, in particular, for making metal connecting plates according to the above description. The sheet metal material is either provided in a necessary thickness or is rolled or stretched into the necessary thickness, wherein, in particular, a preferential strength direction can be induced. Subsequently, the sheet metal material is cut to size to form a blank, which can be carried out by machining by means of laser, water jet, electrical discharge machining and/or similar cutting methods. The cutouts for the first and second elements are hereupon provided, wherein the cutouts are generally smaller than the holes in the metal connecting plate according to the above description, because in work step c) for the creation of the projecting rim the cutouts are expanded.

Following work step b), work steps c) and d) are carried out. The cutouts are here formed into the respective elements by deep drawing, so that a wide stop face is formed, whereby, in use in an energy chain, a reduced surface pressure arises in respect of the elements. In work step d), the area comprising the first elements and the area comprising the second elements, i.e. the first and the second end of the connecting plate, are mutually offset by a step. In this case, work step d) can be performed before, during or after work step c) and/or parts of work step b), for example the creation of the cutouts. The step is preferably formed such that two connected connecting plates are connected to one another in such a way that the respective base areas of the first and second elements are aligned parallel to the extent of the energy chain, i.e. the guided lines, hoses or the like, and are not mutually inclined. As a result of this low-complexity method for making a metal connecting plate, a very reliable and stable metal connecting plate is created with very low production cost.

In a further advantageous version of the method, the sheet metal material is heat-treated before, during and/or after one of work steps c) and d).

As a result of the heat treatment, in particular a hardening of the surface of the sheet metal material is obtained, wherein the ductility of the material or the flexibility of the metal connecting plate is maintained. Preferably, only the corresponding stop faces of the first elements and second elements are here heat-treated; for it is at these stop faces that the greatest surface load occurs.

In a further advantageous embodiment of the method, work steps c) and d) are performed with a single common tool.

Work steps c) and d) are here carried out, in particular, simultaneously in one production work step. Also further elements for the design of the metal connecting plate can here be performed by means of the common tool. For instance, a guide bracket for the rotary movement of two mutually connected connecting plates can here be provided. Quite particularly preferably, the provision of the cutouts can be catered for by means of a punch attachment on the deep-drawing tool, so that work step b) can also be carried out virtually simultaneously.

The features disclosed herein can be mutually combined in any chosen, technologically sensible manner and can be supplemented by illustrative facts from the description and details from the figures, whereby further versions of the invention are revealed.

The invention, and also the technical environment, are more closely illustrated with reference to the figures. The figures show particularly preferred illustrative embodiments, to which the invention is not, however, limited. In particular, it should be pointed out that the figures and, in particular, the represented size relationships are purely schematic.

Figure 2:
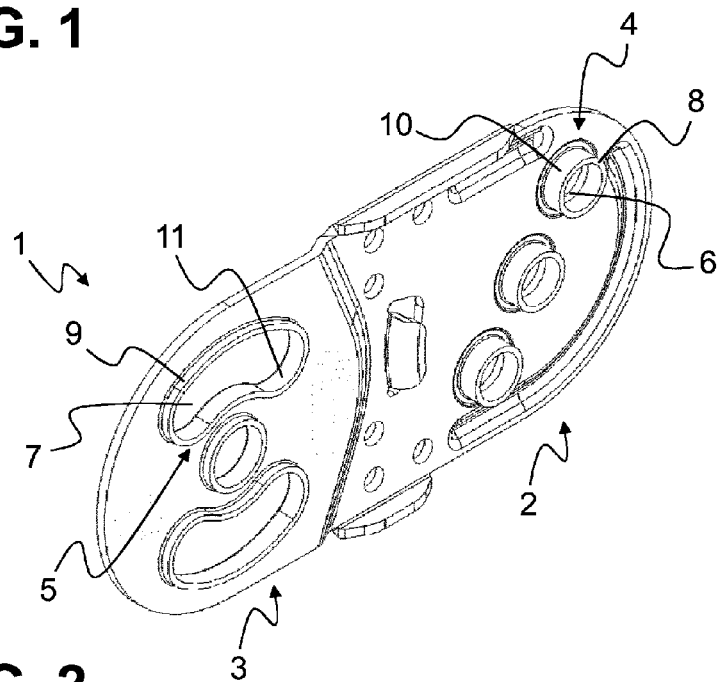

FIG. 1: shows a version of the metal connecting plate in top view;

FIG. 2: shows a version of the metal connecting plate in three-dimensional view;

FIG. 3: shows a side view of a first end of a version of the metal connecting plate;

FIG. 4: shows a side view of a of a version of the metal connecting plate; and

FIG. 5: shows a version of the metal connecting plate in side view from above as installed in an energy chain.

FIG. 1 shows a version of the metal connecting plate 1 in top view, wherein in the representation on the left a first end 2 and in the representation on the right a second end 3 is represented. In this version of the metal connecting plate 1, on the first end 2 are provided two first elements 4, which can be introduced into the kidney-shaped second elements 5 of a second end 3 of a further, structurally identical metal connecting plate 1. For greater clarity, respectively only one of the elements is provided with reference symbols. The first element 4 has a first hole 6 having a first projecting rim 8. It should here be noted that the projecting rim 8 of the first hole 6 extends (substantially) perpendicularly to the metal connecting plate 1. On the second end 3 is provided the kidney-shaped second element 5, which has a second hole 7 having a second projecting rim 9. The second element 5 is arranged to receive a first element 4, so that a rotation between two mutually connected metal connecting plates 1 within the kidney shape of the second hole 7 is possible. The here represented metal connecting plate is produced from a metal sheet 12.

FIG. 2 shows a version of the metal connecting plate 1, wherein here the first stop face 10 and the second stop face 11 of the first element 4 and of the second element 5 can be clearly seen in the three-dimensional view. The metal connecting plate has a first end 2 and a second end 3. On the first end 2 are shown two first elements 4 having a first hole 6 and a first projecting rim 8, which latter extends perpendicularly to the extent of the metal connecting plate 1. In this case, the projecting rim 8 forms on the outer periphery a stop face 10, which can be introduced into the second hole 7 of the second element 5 and with the inner face of the second projecting rim 9, which forms the second stop face 11, enables two connected metal connecting plates 1 to be guided within the kidney shape of the second element 5.

FIG. 3 shows a side view of a version of the metal connecting plate 1 from the first end 2 onto the first elements 4. In this view, it is evident that the projecting rim or the stop face 10 of the first element 4 has a height congruent with the second element 5.

In FIG. 4, a side view of a version of the metal connecting plate 1, from the second end 3 onto the second elements 5, is represented. The projecting rim 9 of the second element 5 is herein discernible.

In FIG. 5, a version of the metal connecting plate 1 is represented from above, as it is installed in an energy chain or in a chain link. The step 13 in the metal connecting plate 1 between the first end 2 and the second end 3 is herein discernible. Of the first element 4, the stop face 10 can be seen and, of the second element 5, the projecting rim 9 can be seen.

With the here proposed metal connecting plate of a chain link of an energy chain, an energy chain offering high stability and long service life can be provided, which energy chain can be made with a simple production process both for large batch production and for small batch production.

REFERENCE SYMBOL LIST 1 metal connecting plate
2 first end
3 second end
4 first element
5 second element
6 first hole
7 second hole
8 first projecting rim
9 second projecting rim
10 first stop face 11 second stop face
12 metal sheet
13 step

The invention claimed is:

1. A metal connecting plate of a chain link of an energy chain having two ends, wherein one end has first elements and the other end has second elements, wherein the first elements can be inserted into the second elements of a further connecting plate in such a way that the connecting plates are rotatably connected to one another, wherein the first and the second elements are respectively formed by a hole having a projecting rim and the projecting rims form mutually corresponding stop faces which protrude substantially perpendicularly to an extent of the connecting plate; and wherein the first and second elements extend from the connecting plate in a same direction from a single side of the connecting plate.

2. The metal connecting plate as claimed in claim 1, wherein the stop faces are shaped such that each stop face in the first elements fully overlap a stop face in the second element.

3. The metal connecting plate as claimed in claim 1, wherein at least one of the first elements are arranged to receive a rivet extending from respective ones of the second element into which the at least one of the first elements are inserted.

4. The metal connecting plate as claimed in claim 1, wherein the connecting plate is produced from a steel alloy or an aluminum alloy.

5. The metal connecting plate as claimed in claim 4, wherein the connecting plate is produced from an aluminum alloy having a tensile force $R_m$ from 190 to 540 N/mm² and a yield point $R_{p0,2}$ from 280 to 470 N/mm².

6. The metal connecting plate as claimed in claim 4, wherein the connecting plate is produced from a steel alloy having a tensile force $R_m$ from 250 to 1200 N/mm² and a yield point $R_{p0,2}$ from 150 to 1000 N/mm² having a tensile force $R_m$ from 250 to 800 N/mm² and a yield point $R_{p0,2}$ from 150 to 300 N/mm².

7. The metal connecting plate as claimed in claim 1, wherein the connecting plate has increased strength values as a result of surface treatment hardening the surface of the stop faces.

8. The metal connecting plate as claimed in claim 1, wherein the connecting plate has two first elements and two second elements.

9. The metal connecting plate as claimed in claim 1, wherein the connecting plate is shaped from a metal sheet and the first and second elements are formed by deep-drawing selected portions of the metal sheet in a direction protruding perpendicularly from the metal sheet.

10. The metal connecting plate as claimed in claim 1, wherein the first and second elements of two connecting plates connect to one another by non-positive locking comprising butting portions of the first elements with portions of the second elements.

11. A chain link of an energy chain, comprising at least two mutually connected metal connecting plates as claimed in claim 1.

12. An energy chain for guided movable reception of energy lines, the energy chain having at least two chain links as claimed in claim 11.

13. The metal connecting plate as claimed in claim 1, wherein the first and second elements of two connecting plates connect to one another by positive locking comprising a connector rivet disposed between and physically connecting the first and second element.

14. The metal connecting plate as claimed in claim 1, wherein the first and second elements of two connecting plates connect to one another by non-positive locking and positive locking, the positive locking comprising a connector bolt disposed between and physically connecting the first and second element.

15. The metal connecting plate as claimed in claim 1, wherein the first and second elements extend from the connecting plate for a distance that is greater than a thickness of the connecting plate.

16. The metal connecting plate as claimed in claim 1, wherein the first and second elements extend from the connecting plate for a same distance.

* * * * *